United States Patent [19]
Harris et al.

[11] Patent Number: 5,470,414
[45] Date of Patent: * Nov. 28, 1995

[54] METHOD OF MAKING FLAT STOCK HAVING A BEARING SURFACE AND THE FLAT STOCK MADE THEREBY

[75] Inventors: Bernard Harris, Northbrook; Dennis E. Bozych, Downers Grove, both of Ill.

[73] Assignee: Rexnord Corporation, Milwaukee, Wis.

[*] Notice: The portion of the term of this patent subsequent to Feb. 22, 2011, has been disclaimed.

[21] Appl. No.: 131,023

[22] Filed: Oct. 4, 1993

Related U.S. Application Data

[63] Continuation-in-part of Ser. No. 4,508, Jan. 14, 1993, abandoned.

[51] Int. Cl.⁶ .................. B65H 81/00; F16C 33/00
[52] U.S. Cl. .................. 156/174; 156/173; 156/425; 29/898.03; 29/898.055; 384/42; 384/298; 384/300; 384/908; 384/911
[58] Field of Search .................. 156/173, 174, 156/175, 425; 384/42, 300, 298, 297, 911, 908; 29/898.055, 898.052, 898.03

[56] References Cited

U.S. PATENT DOCUMENTS

| | | |
|---|---|---|
| 2,907,612 | 10/1959 | White . |
| 2,910,329 | 10/1959 | Runton . |
| 3,110,530 | 11/1963 | Herman . |
| 3,131,979 | 5/1964 | Shobert . |
| 3,458,374 | 7/1969 | Shobert . |
| 3,533,668 | 10/1970 | Tunis, III . |
| 3,560,065 | 2/1971 | Shobert et al. . |
| 3,692,375 | 9/1972 | Matt et al. . |
| 3,701,489 | 10/1972 | Goldsworthy et al. ............. 156/175 X |
| 3,734,585 | 5/1973 | Conru . |
| 3,740,285 | 6/1973 | Goldsworthy et al. ................ 156/425 |
| 3,802,975 | 4/1974 | Saidla ..................... 156/173 |
| 3,804,479 | 4/1974 | Butzow et al. ................ 139/420 R X |
| 3,832,255 | 8/1974 | Shobert . |
| 3,864,197 | 2/1975 | Shobert . |
| 4,107,381 | 8/1978 | Butzow et al. . |
| 4,109,978 | 8/1978 | Ernst et al. ..................... 29/898.055 X |
| 4,258,960 | 3/1981 | Harris .................... 156/175 X |
| 4,943,334 | 7/1990 | Medney .................. 156/174 |
| 4,976,550 | 12/1990 | Shobert . |
| 5,087,132 | 2/1992 | Tanaka et al. . |
| 5,167,741 | 12/1992 | Itoi ..................... 156/174 X |
| 5,229,198 | 7/1993 | Schroeder .......................... 384/300 X |
| 5,288,354 | 2/1994 | Harris et al. ............................ 156/154 |

FOREIGN PATENT DOCUMENTS 1233103  5/1971  United Kingdom .

*Primary Examiner*—Jeff H. Aftergut
*Attorney, Agent, or Firm*—Michael, Best & Friedrich

[57] ABSTRACT

A method of making a filament wound flat stock member and the filament wound flat stock member made by that method. A low fraction bearing surface is formed on a support having a flat surface by placing a self-lubricating material on the flat surface. A matrix is formed upon the self-lubricating material by winding thereon a resin-impregnated filamentous material. The winding is continued until a desired outer matrix dimension is obtained and the resin is cured to bond the materials together into a hardened stock member. The hardened stock member is removed from the flat of the support to provide a filament wound flat stock member having an exposed bearing surface of the self-lubricating material.

7 Claims, 4 Drawing Sheets

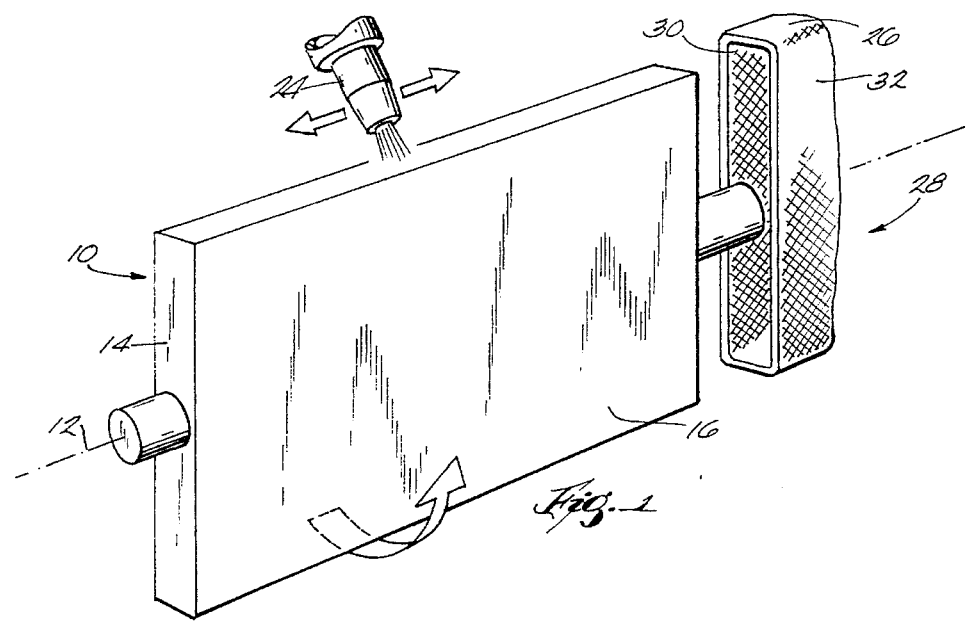
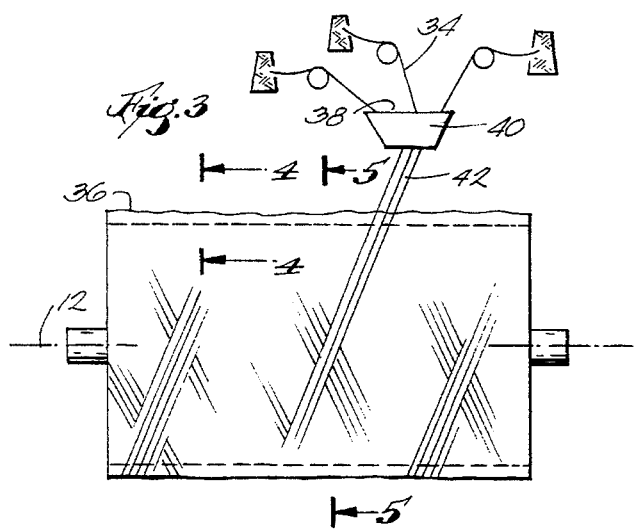
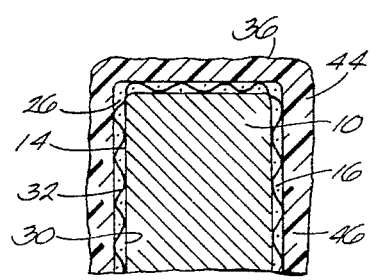
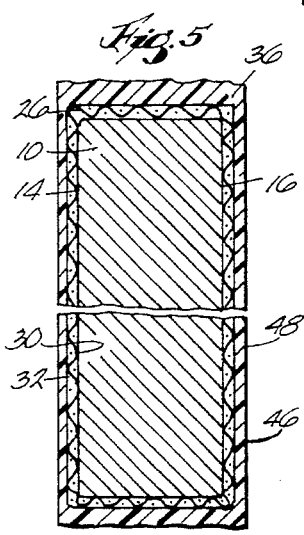 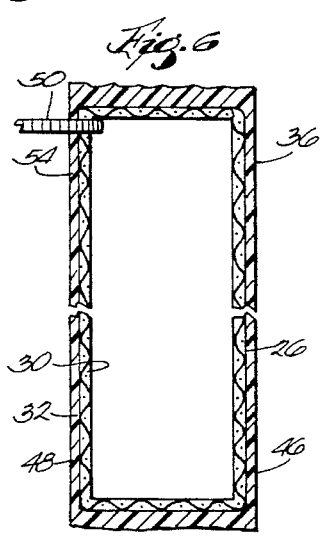 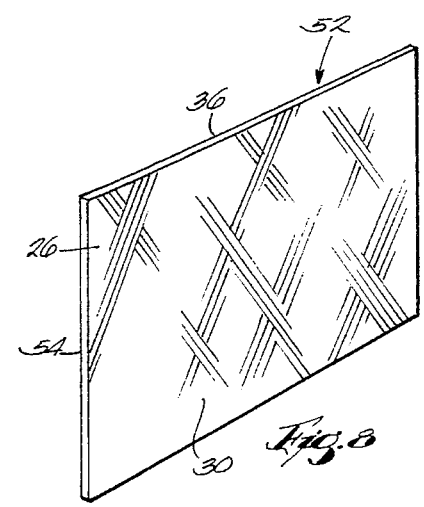

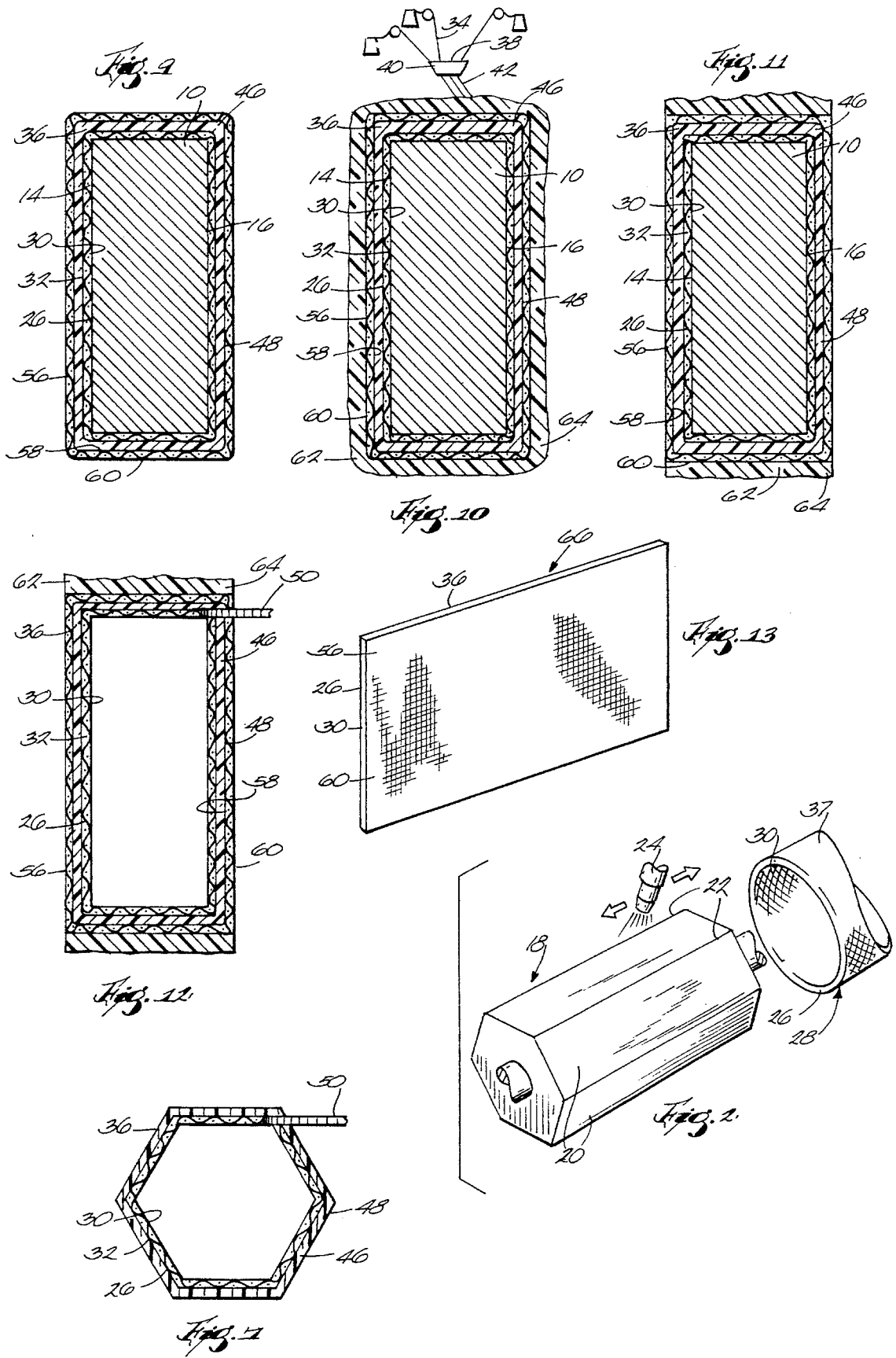

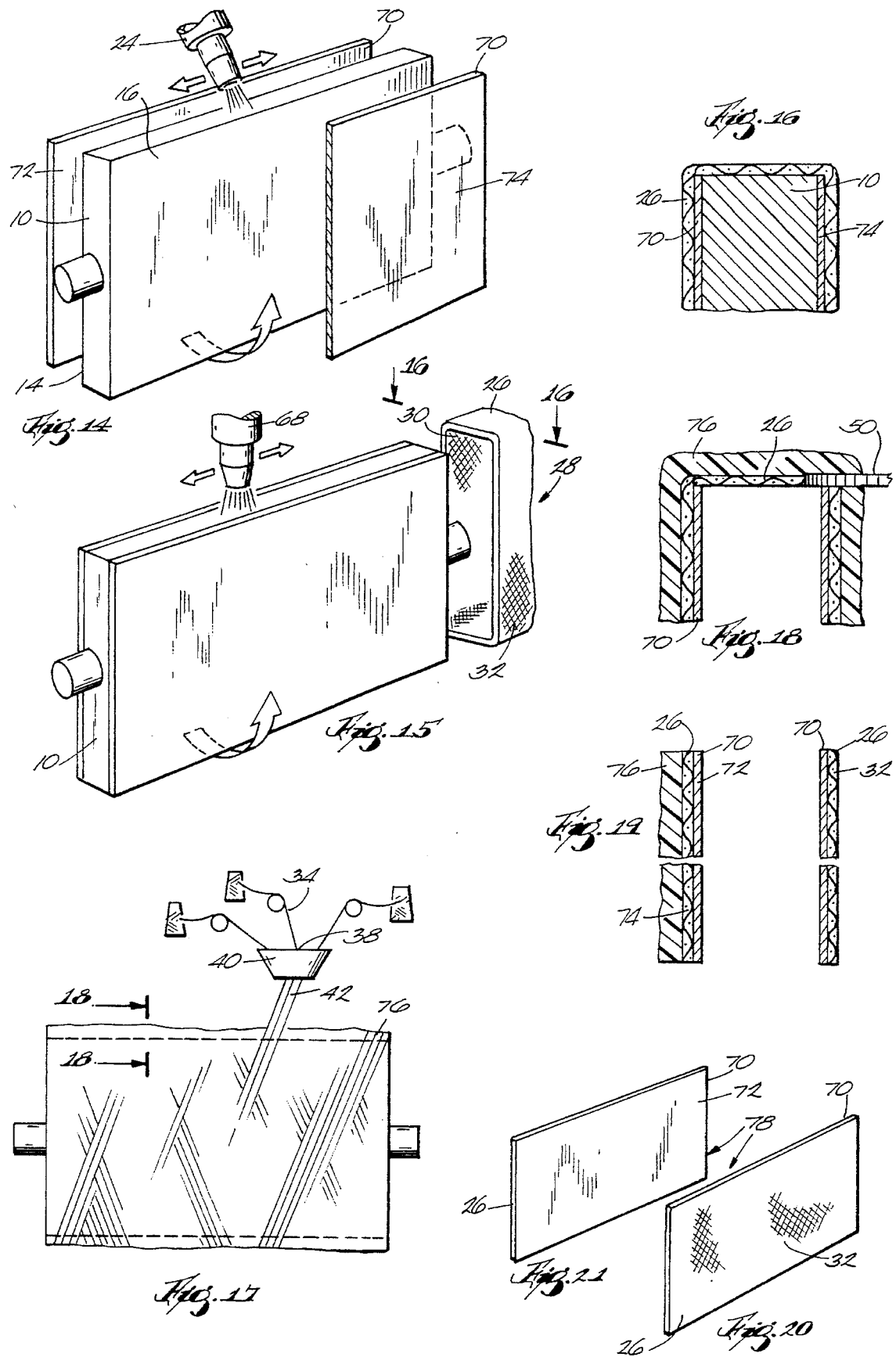

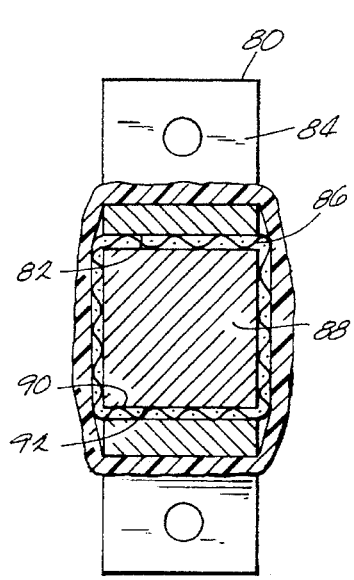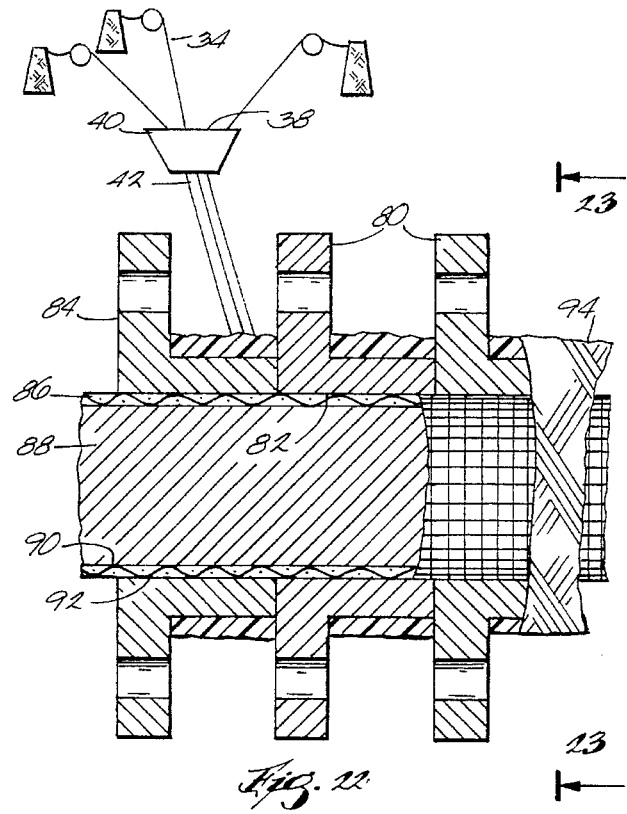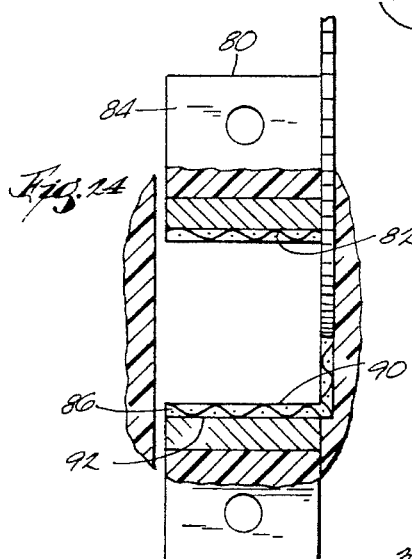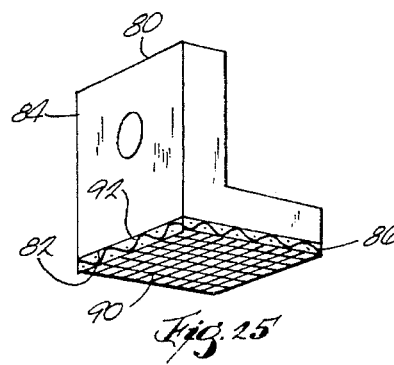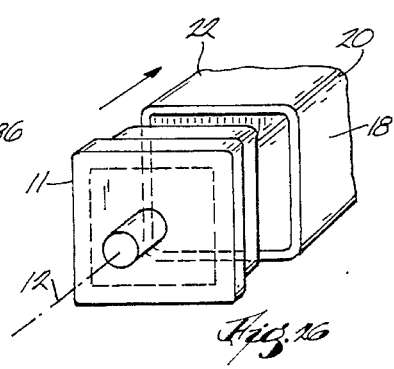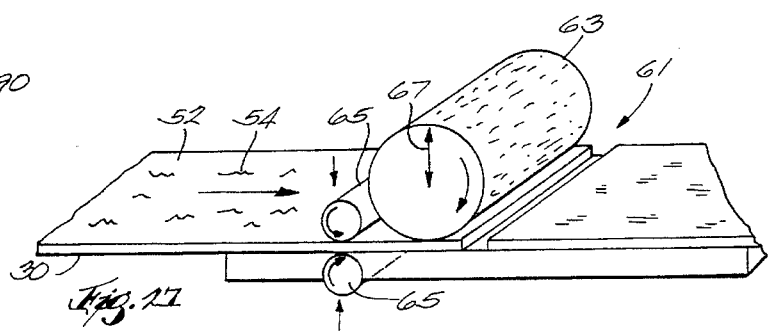

METHOD OF MAKING FLAT STOCK HAVING A BEARING SURFACE AND THE FLAT STOCK MADE THEREBY

This is a continuation-in-part of co-pending application Ser. No. 08/004,508, filed Jan. 14, 1993, now abandoned.

BACKGROUND OF THE INVENTION

This invention relates to bearing materials, and, more particularly, to a method for producing a flat stock having a bearing surface.

It is known in the prior art to produce a flat bearing material having a low friction surface of self-lubricating material such as TEFLON. U.S. Pat. No. 5,087,132, issued on Feb. 11, 1992, to Tanaka et al., and British Patent No. 1,233,103, issued on May 26, 1971, to James Victor Shepherd, are illustrative of prior art methods.

In these known methods of U.S. Pat. No. 5,087,132 and British 1,233,103 for applying a low friction bearing surface of self-lubricating material to a flat member, the TEFLON material is typically wetted and then matched to the flat material followed by pressing against the flat member. In all such methods, particular care must be taken to ensure that the mating of the low friction material and the flat surface of the backing material is very close prior to pressing and elevation to cure temperature, otherwise an uneven bearing surface can be produced or uneven bonding of the TEFLON material to the surface of the support can result. The cloth must be evenly applied to the support surface to prevent creases or irregularities being incorporated into the cloth during the pressing and heat curing steps. Additionally, the amount of resin applied must be carefully controlled to avoid excess resin forming aggregations of resin between the cloth and supporting surface on one hand, while on the other insuring that sufficient resin is present to securely bond the cloth to the flat surface. Furthermore, the pressing requires the provision of expensive pressing equipment and increases the labor costs.

The prior art and method disclosed in U.S. Pat. No. 4,258,960 does not produce flat stock. It produces a square filament wound slip sleeve liner having flat outer surfaces and inner surfaces of self-lubricating material. In this patent after the slip sleeve liner has been formed and cured its outer surfaces are machined to provide a finished sleeve of small square cross section defining a bore approximately ⅜ inches square.

All of the prior art methods are used to produce small sized components. There exists a need for a method of producing large size flat stock having a self-lubricating material bonded thereto at low cost that will have a long service life while withstanding severe stress and environmentally harsh service conditions as for example when used in expansion slip joints for bridges and roads.

The problem with known methods as above described is that it is not feasible to use them to produce large sheets of flat stock. These known methods are complex, time consuming, require special tooling and as a consequence components made thereby are expensive.

A simpler, more reliable and more consistent method is thereby required for producing inexpensive flat stock material having a bonded low friction bearing surface of very even and high quality.

SUMMARY OF THE INVENTION

Among the objects of the invention is to provide an improved method of producing filament wound flat stock having one or more bearing surfaces.

Another object of the invention is to provide such a method whereby the bearing surface applied to the flat stock is tightly conformed and intimately bonded to the filament wound flat stock surface without the use of pressing equipment.

The achievement of these and other objects is provided by a first embodiment of the method which comprises the steps of providing a support having at least one flat surface, preferably in the form of an elongated mandrel having a longitudinally extending axis and at least two flat surfaces. The flat surfaces each having longitudinally extending edges interfacing with edges of adjacent flat surfaces.

A low friction bearing surface is formed by placing a self-lubricating material on at least one flat surface of the support, such as a fabric of tetrafluoroethylene. The fabric may include shrinkable fibers and the fabric can be shrunk on the support prior to the forming of a bearing matrix thereon.

The matrix is formed by winding a filamentous material over the self lubricating material, whereby the winding tension causes the self-lubricating material to intimately conform to the flat surface. Winding is continued until a desired matrix dimension is obtained.

A hardenable liquid bonding resin is applied to interfuse between the filamentous and self-lubricating materials to form an unhardened stock member wetted with resin, which is hardened to bond the materials together into a hardened stock member with unfinished exposed surfaces.

The hardened stock member is cut along the interfacing edges either before the after removal thereof from the mandrel to provide unfinished filament wound flat stock sheets each having a finished exposed bearing surface of the self-lubricating material on one side and an unfinished exposed surface on the other side. The unfinished flat stock sheets are passed through a surface finishing machine such as a sander to finish the unfinished surface and provide a finished flat stock of desired thickness.

In a second embodiment, a metallic reinforcement material is placed over the mandrel prior to or after the self-lubricating material. The matrix is then formed upon the self-lubricating material for a metallic reinforcement material by applying the hardenable liquid bonding resin to interfuse between the filamentous and metallic materials. In one form of the second embodiment, the metallic reinforcement material comprises a thin gauge metal member applied directly onto the surface of the mandrel. In another form of the second embodiment, the metallic reinforcement material comprises a preformed metal member, such as a bracket, placed over a resin wetted self-lubricating material. A predetermined portion of the matrix is then removed to expose the metallic reinforcing material or self-lubricating material.

In the first embodiment, the method produces a filament wound flat stock member comprising a matrix of filamentous material having a low friction bearing surface of self lubricating material integrally bounded to at least one surface. In the second embodiment, the method can be used to produce a flat stock comprising a metal sheet or preformed member having a low friction bearing surface of self lubricating material integrally bounded to at least one surface.

Other features or advantages of the invention will become apparent to those of ordinary skill in the art upon review of the following detailed description, claims and drawings.

BRIEF DESCRIPTION OF THE DRAWINGS

FIG. 1 is a perspective view of a flat winding mandrel coated with a parting agent and showing a sleeve of low friction fabric positioned to be applied over the external surface.

FIG. 2 is a perspective view of an alternative winding mandrel having a hexagonal cross sectional configuration.

FIG. 3 is a plan view showing the winding mandrel assembly of FIG. 1 having an a overlayment of resin impregnated filaments applied over the fabric.

FIG. 4 is a partial cross section taken along line 4—4 of FIG. 3 showing the assembly of winding mandrel, fabric and overlayment.

FIG. 5 is a cross section taken along line 5—5 of FIG. 4 but showing the external surfaces of the cured overlayment finished to provide an overlayment of a desired dimension.

FIG. 6 is a cross section similar to FIG. 5 with the mandrel removed and showing detachment of sheets of flat stock by a cutting tool.

FIG. 7 is a cross section showing detachment of the flat stock sheets in the alternative embodiment depicted in FIG. 2.

FIG. 8 is a perspective view of a finished filament wound flat stock member having a TEFLON fabric applied to one side.

FIG. 9 is a cross section of the mandrel assembly similar to FIG. 5 showing a modification of the first embodiment which includes a second layer of fabric applied over the external surface.

FIG. 10 is a cross section of the mandrel assembly similar to FIG. 9 having a second layer of overlayment applied over the second fabric layer.

FIG. 11 is a cross section of a mandrel assembly similar to FIG. 10 wherein portions of the harden overlayment have been removed along the flat surfaces to expose the second layer of fabric.

FIG. 12 is a cross section of hardened overlayment removed from the mandrel being cut into flat stock.

FIG. 13 is a perspective view of a double sided low friction fabric-coated flat stock removed from the mandrel of FIG. 12.

FIG. 14 is a perspective view of a flat winding mandrel showing initiation of production of a second embodiment.

FIG. 15 is a perspective view similar to FIG. 14 showing application of fabric over the metallic backing members.

FIG. 16 is a partial cross section of the mandrel showing the fabric applied over the metallic backing members.

FIG. 17 is a plan view showing of a filament wound overlayment being applied over the fabric and metallic backing members on the mandrel.

FIG. 18 is a cross section taken along lines 18—18 of FIG. 17 showing the relationship of the metallic backing members, fabric and overlayment, and the application of a cutting tool to separate two flat stock sheets.

FIG. 19 is a cross section of the flat stock from FIG. 18 showing removal of the overlayment of one flat stock sheet to expose the self-lubricating fabric.

FIG. 20 is a perspective view of the fabric surface side of the metallic backed flat stock removed from the mandrel of FIG. 19.

FIG. 21 is a perspective view of the metallic surface side of the TEFLON sided metallic flat stock removed through the mandrel of FIG. 19.

FIG. 22 is a partially cut-away plan view of a modification of the second embodiment of the invention wherein a TEFLON fabric and a metallic preform have been applied over the mandrel and showing filament winding of an overlayment on the assembly.

FIG. 23 is a cross section taken along lines 23—23 of FIG. 22 showing the relationship of mandrel fabric and metal preformed to the overlayment.

FIG. 24 shows the hardened stock member removed from the mandrel and the overlayment being removed from the lateral portions of the metallic preform.

FIG. 25 shows a finished TEFLON fabric backed preform where the overlayment has been removed from the preform.

FIG. 26 is a perspective view of another embodiment of winding mandrel formed of a standard structural steel tubular element having a square configuration.

FIG. 27 is a perspective view of a surface finishing machine finishing the unfinished surface of a sheet of flat stock.

DESCRIPTION OF THE PREFERRED EMBODIMENT

Referring to the drawings, the method of the invention first comprises providing a support preferably in the form of an elongated mandrel 10 (FIG. 1) having a longitudinally extending axis 12 and a pair of flat longitudinal surfaces 14 and 16. If desired, the support may be formed as an elongated mandrel 18, FIG. 2, having a plurality of longitudinally extending flat surfaces 20, each having longitudinally extending edges 22 interfacing with edges 22 of adjacent flat surfaces 20. The preferred form of elongated mandrel 18 is shown in FIG. 26 and comprises a standard structural steel tubular element of square cross section. Such structural steel tubular elements are very low in cost and come in various standard cross sectional shapes, sizes and lengths when a standard structural steel tubular element is used as the mandrel it is cut to the desired length and a plug 11 is inserted in each end (only one plug 11 is shown in FIG. 26) to provide the center of its longitudinal axis of rotation 12. By using standard structural steel tubular elements a low cost mandrel of any cross sectional size can be provided with flat side surfaces 20 of desired wide widths and long lengths as required to minimize loss of material due to finish trimming.

The mandrel is coated with a suitable parting agent 24 and a self-lubricating material, shown in FIG. 1, preferably a woven TEFLON fabric 26 is applied over the mandrel 10. For ease of application the fabric 26 can be woven into a sleeve 28 which can be slid over the mandrel 10. The inner surface 30 of the fabric 26 will become the bearing surface in the finished stock material, while the fabric outer, or bonding surface 32 forms a bonding substrate for subsequent operations. In a preferred embodiment the low friction fabric 26 comprises lengthwise yarns predominantly of self-lubricating fibers, such as TEFLON fibers, and circumferential yarns of a material, for example DACRON yarn, which shrinks when heated to 300° F. Such a fabric 26 is described in U.S. Pat. No. 3,804,479, the teachings of which are incorporated herein by reference.

The fabric sleeve 28 is heated in order to shrink the shrinkable material and tightly conform the fabric inner bearing surface 30 to the mandrel surfaces 14 and 16 in FIG. 1, and mandrel surfaces 20 in FIG. 2. An alternative to heat shrinking involves applying the fabric 26 loosely over the mandrel surfaces 14 and 16, or 20, and stretching the fabric 26 axially, which concomitantly diminishes the circumference of the fabric sleeve 28 and thereby tightens the fabric 26 over the surfaces 14 and 16.

Referring now to FIG. 3, resin-impregnated filament material such as fiberglass filaments 34 are wound over the fabric 26, thereby forming a matrix 36 upon the fabric 26. The winding is done under tension which further conforms the fabric 26 to the flat surfaces 14 and 16. Winding is continued until a desired dimension of matrix 36 is obtained. The fiber glass filaments 34 are preferably wound angularly with respect to the mandrel axis 12.

A preferred method for applying the filament matrix 36 is through a filament winding method much as that described in U.S. Pat. No. 3,974,009, the teachings of which are incorporated herein by reference. In this method a hardenable liquid resin 38 is supplied simultaneously with the winding of the filaments 34 (FIG. 4), by passing the filaments 34 through a liquid resin bath 40 prior to winding on the mandrel 10. In FIG. 4 the resin bath 40 is a cone-shaped receptacle. A plurality of filaments 34 are oriented parallel to each other, and will form a tape 42 of resin 38-impregnated filaments 34. The bath 40 is supported on a reciprocating carriage, not shown, which may also be provided with means, not shown, to keep the bath 40 supplied with resin 38. The direction of the winding changes when the tape 42 nears the ends of the mandrel 10. The filaments 34 are thus helically wound in overlapping layers.

By repeated passes of the tape 42 a plurality of filament layers are applied over the inner race peripheral surface to form the matrix 36 of filaments 34. The hardenable liquid bonding resin 38 interfuses between the matrix filaments 34 and the fibers of the self-lubricating fabric 26 to form an unhardened stock member 44 wetted with resin 38, FIG. 4.

The resin 38 is then hardened, or cured. Curing of the resin 38 is typically effected by subjecting the unhardened stock member 44 to elevated temperatures by any known method, such as by heating in an oven, not shown. The resin 38 can also be heated directly, such as by infrared or high frequency radio radiation, also not shown. The mandrel 10 can be rotated during the curing cycle to prevent dripping. The time for cure typically depends on temperature and catalyst, when the latter is utilized.

Upon curing the hardened resin 38 bonds the filament and fabric materials together into a hardened stock member 46, which may be finished to a desired outer dimension, or surface 48, by grinding or milling, FIG. 5. Bonded filaments 34 extend circumferentially within the hardened stock member 46. The mandrel 10 may be withdrawn at this time for reuse, leaving a tube-like, hardened stock member 46 of the filament wound matrix 36 surrounding and bonded to the fabric 26, FIGS. 6 and 7. Conversely, the mandrel 10 may be maintained within the hardened stock member 46 to provide a support for subsequent machining operations.

The finished hardened tube-like stock member 46 is then cut by tool 50 to separate the hardened stock member 46 into elongated individual sheets of flat stock 52, one of which is shown in FIG. 8. In FIG. 7, a plurality of sheets of flat stock 52 are removed from the hexagonal mandrel 18 by cutting with tool 50 along the interfacing edges 22 of flat surfaces 20. Flat stock 52 is removed from each flat surface 20 of such a hexagonal mandrel 18.

The resulting filament wound flat stock sheet 52, FIG. 8, presents two opposed surfaces; one surface 54 of hardened and finished filament wound matrix 36 and one bearing surface 30 of self-lubricating fabric 26 integrally bonded to the matrix 36. For example if it is desired to produce 7" or 8" wide flat stock for use as an expansion slip joint in a roadway or bridge a structural steel mandrel 18, as shown in FIG. 26 is selected having sides 20 of the desired width. This will result in production of unfinished flat stock sheets 52 each having an unfinished width that closely approximates their required finished width when removed from the mandrel 18 to thereby minimize waste of material by keeping the amount of material removed by width trimming to an absolute minimum. Because structure steel tubular elements are low in cost many different sized mandrels can be provided so that flat stock sheets 52 of various widths can be readily produced with minimum tooling costs and with virtually no trimming waste of fiberglass filaments, resin and self-lubrication fabric all of which are expensive.

Referring now to FIG. 27, each unfinished filament wound flat stock sheet 52 is passed through a surface finishing machine 61 having a sanding element 63 and rotatable power driven feed rollers 65. As shown the sanding element 63 is in the form of a sanding drum but it could also be in the form of a sanding belt of desired width. The standing element 63 is adjustable up or down in the direction of arrows 67 to set the clearance necessary to cause each finished flat stock 52 to have a desired thickness after it has passed through the finishing machine 61.

A modified form of the first embodiment provides the flat stock member 52 with two surfaces of self-lubricating material as will now be described. As shown in FIG. 9, a second layer of self-lubricating fabric 56 is applied and shrunk over the finished outer surface 48 of the hardened stock member 46 of FIG. 4. The second layer of fabric 56 has an inner surface 58 tightly conformed to the finished outer surface 48 and an outer, or bearing surface 60. A second layer of matrix 62, FIG. 10, is applied over the second layer of fabric 56, in the same fashion as described for applying the first matrix 36 depicted in FIG. 3. The second layer of fabric 56 has a woven texture which permits penetration by the resin 38 of the resin impregnated filaments 34 used in the filament winding method. This hardenable bonding resin 38 will penetrate through the fabric 56 and when cured will bond the second fabric inner-surface 58 to the finished outer surface 48 of the previously hardened stock member 46. As this filament winding is done under tension, a pressure is exerted by the filaments 34 sufficient to further force the second fabric 56 tightly against the outer surface 48 of hardened stock member 46 and conform the fabric 56 tightly thereon. The winding pressure is typically on the order of 2 to 4 lbs/inch.

The resin 38 is cured to securely bond the second layer of fabric 56 to the finished outer surface 48 of the hardened stock member 46 and to matrix 62. This method for applying and integrally bonding self-lubricating material to an outer surface is described in our co-pending application titled "METHOD OF BONDING SELF-LUBRICATING FIBERS TO AN EXTERNAL SURFACE OF A SUBSTRATUM", filed on Aug. 26, 1992, application Ser. No. 935,820, and assigned to assignee hereof, which is incorporated herein by reference. The all or part of second matrix 62 is subsequently removed, FIG. 11, such as by grinding, not shown, to expose the second fabric bearing surface 60. The second fabric inner surface 58 remains intimately bonded to the finished outer surface 46 of the first matrix 36.

As seen in FIG. 12, the alternative stock member 64 is detached from the hardened stock member 46 by the cutting tool 50, preferably after removal of the mandrel 10. The resulting elongated sheets of flat stock 66, one of which is shown in FIG. 13, present first and second fabric bearing surfaces 30 and 60 as opposite surfaces thereon.

In a second embodiment, FIG. 14, the mandrel 10 is coated with a parting agent 24 and a reinforcement material such as a thin gauge metal member 70, has an inner surface 72 placed against the mandrel surface 14 or 16. The metal member 70 has an exposed outer surface 74. The reinforcement material can be any material, for example stainless steel, having desired properties for a particular purpose. The inner surface 72 is pre-coated with additional parting agent 24, which is baked on prior to application of the metal member 70 to the mandrel surface 14 or 16. In FIGS. 14 through 20 two such metal members 70 are utilized, one over each mandrel surface 14 and 16. A self-lubricating fabric 26 is applied over the metal member 70, FIG. 15, and shrunk to a tight fit, FIG. 16.

Referring to FIG. 17, a filament wound matrix 76 is built up over the fabric 26 in the same fashion as described for building up the matrix 36 in FIG. 3. After building up the matrix 76 to a desired dimension, filament winding is stopped and the entire assembly is heated to cure the resins 38 and 68 to harden the matrix 76, FIG. 18. The mandrel 10 is removed and the matrix 76 cut into sheet of flat stock 78. As seen in FIG. 19, the flat stock 78 may then be finished by removing a predetermined portion of the hardened matrix 76 to expose at least a portion of the outer surface 32 of the fabric 26.

The method of the second embodiment produces a flat stock 78 comprising at least one friction bearing surface 32 of a self lubricating fabric 26 integrally bonded thereto, FIG. 20, and an opposite exposed surface 72, FIG. 21, of the reinforcement material 70. The filament wound matrix 76 can be left, as shown in FIG. 19, covering all, a portion or none of the fabric surface 32.

The method described relative to FIGS. 14 through 21 is a less expensive and cumbersome method for producing metal bearing flat stock than prior art pressing and curing methods for affixing a metal backing sheet to resin-impregnated low friction material.

A modification of the second embodiment is disclosed in FIGS. 22–25, wherein the reinforcement material is a plurality of preformed metal members such as brackets 80, with flat surfaces 82 and exposed outer preform portions 84.

As seen in FIG. 22, the preform members 80 are placed on a low friction fabric 86 previously applied and shrunk onto on a mandrel 88. The fabric has an inner bearing surface 90 and an outer bonding surface 92. A parting agent, not shown, is preferably applied over the mandrel 88 prior to application of the fabric 86, and a hardening resin is applied over the fabric bonding surface 92 prior to application of the preform members 80.

A filament wound matrix 94 is built up over the preform members 80 in the same fashion as described for building up the matrix 36 in FIG. 3. The matrix 94, is formed over the preform portions 84 of the preform members 80. The preform member flat surfaces 82 are thereby pressed by the bonding pressure of filament winding into intimate and tight contact with the fabric bonding surface 90. FIG. 23 is a cross section showing the relationship of the mandrel 88, the fabric 86, the preform member 80 and the matrix 94. Curing the resin bonds the fabric 86 to the preform flat surface 82.

After curing, the preform members 80, fabric 86 and matrix 94 are removed from the mandrel 88, and the preform members 80 are detached, with the self-lubrication fabric attached are removed from the mandrel, such as by cutting tool 96, FIG. 24. Any remaining hardened matrix 94 can be removed from the preform portion 84. The resulting preform 80 has a low friction bearing surface 90 of self lubricating fabric 86 integrally bonded to the flat surface 82 of the metal preform 80, FIG. 25.

From the foregoing description, one skilled in the art can make various changes and modifications to adapt the invention to various usages and conditions without departing from the spirit and scope of the invention.

What is claimed is:

1. A method of making a filament wound flat stock bearing member that includes a matrix having a low friction bearing surface of self-lubricating material integrally bonded thereto, said method comprising the steps of:

A. providing a support including a longitudinal extent and at least two flat surfaces, each of said flat surfaces having longitudinally extending edges interacting with edges of adjacent flat surfaces, and then placing a metallic reinforcement material upon one of said flat surfaces;

B. after step A, forming a low friction bearing surface by placing a self-lubricating material over said flat surfaces of said support and on said metallic reinforcement material;

C. forming a matrix upon said self-lubricating material by winding a filamentous material over said self-lubricating material under tension to cause said self-lubricating material to intimately conform to said metallic reinforcement material and continuing said winding until a desired matrix dimension is obtained having longitudinally extending edge regions at said interfacing edges of said flat surfaces;

D. applying a hardenable liquid bonding resin to interfuse between said filamentous material, said self-lubricating material and said metallic reinforcement material to form an unhardened tubular stock member wetted with resin;

E. hardening said resin to bond said materials together into a hardened stock member;

F. removing said hardened stock member from said support;

G. cutting said hardened stock member along said edge regions either before or after removal from said support to provide an unfinished filament wound flat stock sheet having an exposed finished bearing surface of said self-lubricating material; and H. passing said unfinished flat stock sheet through a surface finishing machine to finish said unfinished surface and provide a finished flat stock of desired thickness.

2. The method according to claim 1 wherein said metallic reinforcement material comprises a thin gauge metal member.

3. The method according to claim 1 wherein said metallic reinforcement material comprises a preformed metal member.

4. The method according to claim 1 comprising, after step F, the further step of removing predetermined portions of said matrix to expose said self-lubricating material.

5. A method for making a flat stock bearing member, the bearing member including a backing member, and a low friction material supported on the backing member and bonded to the backing member, said method comprising the steps of:

providing a support member including a flat surface, the flat surface including opposite longitudinally extending edges;

applying a layer of self-lubricating low friction material over the flat surface of the support member, the portion of the layer of self-lubricating low friction material contacting the flat surface of the support member forming a bearing surface;

forming a matrix by winding filaments under tension around the support member and over the layer of self-lubricating low friction material so that the layer of self-lubricating low friction material conforms to the flat surface of the support member, and applying a bonding resin to the filaments to form a filament reinforced composite structure, the resin bonding the matrix to the layer of self-lubricating low friction material;

after said step of forming a matrix over the self-lubricating low friction material, placing an additional layer of self-lubricating low friction material over the matrix, winding additional filaments under tension around the support member and over the additional layer of self-lubricating low friction material, and applying additional bonding resin to the additional filaments to bond the additional layer of self-lubricating low friction material to the matrix;

hardening the bonding resin to form a tubular hardened stock member; and cutting the hardened stock member along the edges of the flat surface of the support member to produce a sheet-like flat stock bearing member, the sheet-like flat stock bearing member including opposite surfaces, a backing member formed by the matrix, and a bearing material integrally bonded to the backing member, the bearing material being formed at least in part by the layers of self-lubricating low friction material, and the bearing surface forming one of the opposite surfaces of the bearing member.

6. A method as set forth in claim 5 wherein the bearing material includes the additional layer of self-lubricating material, the additional layer of self-lubricating material including a bearing surface forming the other of the opposite surfaces of the bearing member, and wherein said step of hardening the bonding resin is followed by removing at least a portion of the additional filaments to expose said other of the opposite surfaces of the bearing member.

7. A method for making a flat stock bearing member, the bearing member including a backing member, and a low friction bearing material supported on the backing member, said method comprising the steps of:

providing a support member;

placing a plate member against the support member, the plate member including a flat surface;

applying a layer of self-lubricating low friction material over the flat surface of the plate member;

forming a matrix by winding filaments under tension around the support member and over the layer of self-lubricating low friction material, and applying a bonding resin to the filaments, the bonding resin bonding the plate member to the layer of self-lubricating low friction material;

hardening the bonding resin to form a tubular hardened stock member on the support member; and finishing the hardened stock member to produce a flat stock bearing member including opposite surfaces, a backing member formed at least in part by the plate member, and a bearing material integrally bonded to the backing member, the bearing material being formed at least in part by the layer of self-lubricating low friction material, said step of finishing the hardened stock member including the steps of cutting the hardened stock member to produce a sheet-like flat stock member, and removing at least a portion of the matrix to expose at least a portion of the self-lubricating low friction material, the exposed portion of the self-lubricating low friction material forming a bearing surface on the flat stock bearing member.

* * * * *

UNITED STATES PATENT AND TRADEMARK OFFICE
CERTIFICATE OF CORRECTION

PATENT NO. : 5,470,414
DATED : November 28, 1995
INVENTOR(S) : Bernard Harris and Dennis E. Bozych It is certified that error appears in the above—identified patent and that said Letters Patent is hereby corrected as shown below:

Column 1, line 14, after "Tanaka et al.," insert
-- U.S. Patent No. 4,258,960, issued March 31, 1981 to Bernard Harris, --

Column 1, line 45, "3/8 inches" should be -- 1 3/8 inches --

Column 4, line 34, "lengths when" should be -- lengths. When --

Column 5, line 64, "matrix 36. For example" should be -- matrix 36.
    For example --

Signed and Sealed this

Twelfth Day of March, 1996

Attest:

BRUCE LEHMAN

Attesting Officer

Commissioner of Patents and Trademarks